[12] United States Patent
Nakamizo et al.

[10] Patent No.: US 9,354,459 B2
[45] Date of Patent: May 31, 2016

(54) LIQUID CRYSTAL DISPLAY DEVICE

(75) Inventors: Masahiko Nakamizo, Osaka (JP);
Fumikazu Shimoshikiryoh, Osaka (JP);
Takamitsu Suzuki, Osaka (JP); Akifumi Hashimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 184 days.

(21) Appl. No.: 14/235,875

(22) PCT Filed: Jul. 26, 2012

(86) PCT No.: PCT/JP2012/068919
§ 371 (c)(1),
(2), (4) Date: Jan. 29, 2014

(87) PCT Pub. No.: WO2013/018637
PCT Pub. Date: Feb. 7, 2013

(65) Prior Publication Data
US 2014/0146265 A1 May 29, 2014

(30) Foreign Application Priority Data
Aug. 2, 2011 (JP) ................................ 2011-169211

(51) Int. Cl.
*G02F 1/133* (2006.01)
*G09G 3/36* (2006.01)
(Continued)

(52) U.S. Cl.
CPC ...... *G02F 1/13306* (2013.01); *G02F 1/136213* (2013.01); *G09G 3/3655* (2013.01);
(Continued)

(58) Field of Classification Search
CPC .................... G02F 1/136213; G02F 1/136286; G02F 1/13306

USPC ................................................. 349/41, 39, 54
See application file for complete search history.

(56) References Cited

U.S. PATENT DOCUMENTS

2005/0122441 A1* 6/2005 Shimoshikiryoh . G02F 1/13624
349/38
2008/0106660 A1 5/2008 Kitayama et al.
(Continued)

FOREIGN PATENT DOCUMENTS

JP 2005-189804 A 7/2005
JP 2009-104050 * 5/2009 ............... G09G 3/36
(Continued)

OTHER PUBLICATIONS

Official Communication issued in International Patent Application No. PCT/JP2012/068919, mailed on Oct. 2, 2012.

*Primary Examiner* — Sang V Nguyen
(74) *Attorney, Agent, or Firm* — Keating & Bennett, LLP

(57) ABSTRACT

In a liquid crystal display device in which one pixel is divided into a plurality of sub-pixels, power consumption is reduced. A liquid crystal display device in which a pixel formation portion forming one pixel includes a first sub-pixel portion and a second sub-pixel portion is provided with a charge sharing circuit (50) for short-circuiting a CS bus line (CSL1) provided for the first sub-pixel portion and a CS bus line (CSL2) provided for the second sub-pixel portion to each other based on a short-circuit control signal (CTL). A CS voltage generating circuit (40) generates CS signals (CS1 and CS2) whose potentials change every predetermined period. The charge sharing circuit (50) short-circuits the CS bus line (CSL1) and the CS bus line (CSL2) to each other at timing at which the potentials of the CS signals (CS1 and CS2) change, based on the short-circuit control signal (CTL).

1 Claim, 16 Drawing Sheets

(51) Int. Cl.
*G02F 1/1362* (2006.01)
*G02F 1/1343* (2006.01)

(52) U.S. Cl.
CPC .............. *G02F2001/134345* (2013.01); *G09G 2300/0443* (2013.01); *G09G 2300/0876* (2013.01); *G09G 2310/06* (2013.01); *G09G 2330/021* (2013.01)

(56) References Cited

U.S. PATENT DOCUMENTS

2009/0128533 A1* 5/2009 Tsubata .............. G02F 1/13624
　　　　　　　　　　　　　　　　　　　345/209
2009/0167739 A1* 7/2009 Tsubata ................ G09G 3/3659
　　　　　　　　　　　　　　　　　　　345/208
2010/0207919 A1* 8/2010 Sawahata ............. G09G 3/3648
　　　　　　　　　　　　　　　　　　　345/209
2011/0106660 A1* 5/2011 Ajjarapu ................ G06Q 30/06
　　　　　　　　　　　　　　　　　　　705/26.41
2011/0157504 A1* 6/2011 Kimura ............. G02F 1/133707
　　　　　　　　　　　　　　　　　　　349/38

FOREIGN PATENT DOCUMENTS

JP　　　　2009-104050 A　　5/2009
WO　　　2006/070829 A1　　7/2006

* cited by examiner

US 9,354,459 B2

LIQUID CRYSTAL DISPLAY DEVICE

TECHNICAL FIELD

The present invention relates to a liquid crystal display device, and more specifically to a liquid crystal display device having a configuration in which one pixel is divided into a plurality of sub-pixels to improve viewing angle characteristics.

BACKGROUND ART

As one drive scheme for a liquid crystal display device, there is conventionally known a scheme in which "one pixel is composed of a plurality of (typically, two) sub-pixels, and liquid crystal is driven such that the luminances of the plurality of sub-pixels differ from each other" (hereinafter, referred to as the "pixel division scheme"). The pixel division scheme is a scheme adopted to improve the viewing angle characteristics of the liquid crystal display device.

FIG. 3 is a circuit diagram showing a configuration of a pixel circuit of a liquid crystal display device adopting the pixel division scheme. As shown in FIG. 3, a pixel formation portion 11 forming one pixel is composed of two sub-pixel portions (a first sub-pixel portion PIX1 and a second sub-pixel portion PIX2). Both of the sub-pixel portions (PIX1 and PIX2) include thin-film transistors (T1 and T2) connected at their gate electrodes to a gate bus line (scanning signal line) GL and connected at their source electrodes to a source bus line (video signal line) SL; pixel electrodes (E1 and E2) connected to the drain electrodes of the thin-film transistors (T1 and T2); liquid crystal capacitances (Clc1 and Clc2) formed by a common electrode EC serving as a counter electrode and the pixel electrodes (E1 and E2); and auxiliary capacitances (Ccs1 and Ccs2) formed by the pixel electrodes (E1 and E2) and CS bus lines (auxiliary capacitance wiring lines) (CSL1 and CSL2). A constant potential Vcom is provided to the common electrode EC. Note that a signal to be supplied to a CS bus line is hereinafter referred to as a "CS signal". Note also that CS signals to be supplied to the CS bus lines CSL1 and CSL2 are denoted by reference characters CS1 and CS2, respectively.

In such a configuration, when the gate bus line GL is placed in a selected state, the thin-film transistors T1 and T2 are placed in an on state. Since the source electrode of the thin-film transistor T1 and the source electrode of the thin-film transistor T2 are connected to the same source bus line SL, the potential of the pixel electrode E1 in the first sub-pixel portion PIX1 and the potential of the pixel electrode E2 in the second sub-pixel portion PIX2 are equal to each other. Thereafter, the potential of one of the CS signal CS1 and the CS signal CS2 is allowed to increase and the potential of the other one is allowed to decrease, by which the potential of the pixel electrode E1 and the potential of the pixel electrode E2 change in opposite directions. By this, the pixel electrode E1 and the pixel electrode E2 have different potentials and thus the first sub-pixel portion PIX1 and the second sub-pixel portion PIX2 have different luminances. As a result, viewing angle characteristics are improved. Note that FIG. 19 shows the waveforms of the CS signal CS1 and the CS signal CS2 in a conventional example. As is grasped from FIG. 19, the CS signal CS1 and the CS signal CS2 alternately repeat a potential having a level higher by a predetermined magnitude than the potential Vcom of the common electrode EC and a potential having a level lower by a predetermined magnitude than the potential Vcom of the common electrode EC, every predetermined period.

Exemplary configurations of a liquid crystal display device adopting the pixel division scheme such as that described above are disclosed in, for example, Japanese Patent Application Laid-Open No. 2005-189804 and WO 2006/070829 A.

PRIOR ART DOCUMENTS

Patent Documents

[Patent Document 1] Japanese Patent Application Laid-Open No. 2005-189804
[Patent Document 2] WO 2006/070829 A

SUMMARY OF THE INVENTION

Problems to be Solved by the Invention

Meanwhile, in recent years, as for a liquid crystal display device, an increase in panel size and an increase in panel resolution have been remarkable. Hence, compared to conventional devices, power consumption has increased. When taking a look at the driving of a CS bus line, power consumption P1 resulting from changing the potential of a CS signal every predetermined period in the manner shown in FIG. 19 is as shown in the following equation (1):

$$P1 = C \times (Vpp)^2 \times f \quad (1)$$

where C is the capacitance value of the CS bus line, Vpp is the voltage amplitude of the CS signal, and f is the frequency of the CS signal.

The capacitance value of the CS bus line is proportional to panel size and panel resolution. Therefore, as is grasped from the above equation (1), the power consumption P increases as the panel size increases or the panel resolution increases. In addition, when the power consumption increases, the amount of heat generated in the device increases. Hence, a reduction in display performance and a reduction in reliability are concerned. From such points of view, too, low power consumption is required.

An object of the present invention is therefore to reduce the power consumption in a liquid crystal display device in which one pixel is divided into a plurality of sub-pixels.

Means for Solving the Problems

A first aspect of the present invention is directed to a liquid crystal display device in which a pixel formation portion forming one pixel includes a first sub-pixel portion including a first pixel electrode and a second sub-pixel portion including a second pixel electrode, and which includes: a liquid crystal panel substrate including a display unit for displaying an image; a first auxiliary capacitance wiring line arranged on the liquid crystal panel substrate such that a first auxiliary capacitance is formed between itself and the first pixel electrode; and a second auxiliary capacitance wiring line arranged on the liquid crystal panel substrate such that a second auxiliary capacitance is formed between itself and the second pixel electrode, the liquid crystal display device comprising:

an auxiliary capacitance signal generating circuit that generates a first auxiliary capacitance signal to be provided to the first auxiliary capacitance wiring line, and a second auxiliary capacitance signal to be provided to the second auxiliary capacitance wiring line; and an auxiliary capacitance wiring line short-circuiting circuit that short-circuits the first auxiliary capacitance wiring line and the second auxiliary capacitance wiring line to each other based on a control signal.

According to a second aspect of the present invention, in the first aspect of the present invention, the auxiliary capacitance wiring line short-circuiting circuit is formed on a board provided near one edge portion, in a direction in which the first auxiliary capacitance wiring line and the second auxiliary capacitance wiring line extend, of the liquid crystal panel substrate.

According to a third aspect of the present invention, in the second aspect of the present invention, the liquid crystal display device further comprises scanning signal lines arranged on the liquid crystal panel substrate so as to extend in parallel with the first auxiliary capacitance wiring line and the second auxiliary capacitance wiring line; and a scanning signal line drive circuit for driving the scanning signal lines, wherein the auxiliary capacitance wiring line short-circuiting circuit is formed on a same board as the scanning signal line drive circuit.

According to a fourth aspect of the present invention, in the third aspect of the present invention, the control signal to be provided to the auxiliary capacitance wiring line short-circuiting circuit is generated in the scanning signal line drive circuit, based on timing of driving each scanning signal line arranged on the liquid crystal panel substrate.

According to a fifth aspect of the present invention, in the third aspect of the present invention, the auxiliary capacitance wiring line short-circuiting circuit and the scanning signal line drive circuit are provided within a same semiconductor chip.

According to a sixth aspect of the present invention, in the first aspect of the present invention, the auxiliary capacitance wiring line short-circuiting circuit is monolithically formed on the liquid crystal panel substrate.

According to a seventh aspect of the present invention, in the sixth aspect of the present invention, the liquid crystal display device further comprises auxiliary capacitance main wiring lines for transmitting the first auxiliary capacitance signal and the second auxiliary capacitance signal to the first auxiliary capacitance wiring line and the second auxiliary capacitance wiring line, respectively, from the auxiliary capacitance signal generating circuit, the auxiliary capacitance main wiring lines being arranged on the liquid crystal panel substrate so as to extend in a direction perpendicular to a direction in which the first auxiliary capacitance wiring line and the second auxiliary capacitance wiring line extend, wherein the auxiliary capacitance wiring line short-circuiting circuit is formed in a region between an auxiliary capacitance main wiring line connected to the first auxiliary capacitance wiring line and an auxiliary capacitance main wiring line connected to the second auxiliary capacitance wiring line, and short-circuits the first auxiliary capacitance wiring line and the second auxiliary capacitance wiring line to each other by short-circuiting the auxiliary capacitance main wiring line connected to the first auxiliary capacitance wiring line and the auxiliary capacitance main wiring line connected to the second auxiliary capacitance wiring line to each other.

According to an eighth aspect of the present invention, in the sixth aspect of the present invention, when a pair of a first auxiliary capacitance wiring line and a second auxiliary capacitance wiring line is defined as an auxiliary capacitance wiring line pair, the auxiliary capacitance wiring line short-circuiting circuit is formed in a region between the first auxiliary capacitance wiring line and the second auxiliary capacitance wiring line, for all auxiliary capacitance wiring line pairs arranged on the liquid crystal panel substrate.

According to a ninth aspect of the present invention, in the first aspect of the present invention, the liquid crystal display device further comprises auxiliary capacitance main wiring lines for transmitting the first auxiliary capacitance signal and the second auxiliary capacitance signal to the first auxiliary capacitance wiring line and the second auxiliary capacitance wiring line, respectively, from the auxiliary capacitance signal generating circuit, the auxiliary capacitance main wiring lines being arranged on the liquid crystal panel substrate so as to extend in a direction perpendicular to a direction in which the first auxiliary capacitance wiring line and the second auxiliary capacitance wiring line extend, wherein the auxiliary capacitance signal generating circuit and the auxiliary capacitance wiring line short-circuiting circuit are formed on a same board provided near one edge portion, in a direction in which the auxiliary capacitance main wiring lines extend, of the liquid crystal panel substrate.

According to a tenth aspect of the present invention, in the first aspect of the present invention, the auxiliary capacitance signal generating circuit stops outputting the first auxiliary capacitance signal and the second auxiliary capacitance signal during a period during which the first auxiliary capacitance wiring line and the second auxiliary capacitance wiring line are short-circuited to each other.

Effects of the Invention

According to the first aspect of the present invention, a liquid crystal display device adopting the pixel division scheme is provided with an auxiliary capacitance wiring line short-circuiting circuit for short-circuiting a first auxiliary capacitance wiring line provided for one of the sub-pixel portions (first sub-pixel portion) and a second auxiliary capacitance wiring line provided for the other sub-pixel portion (second sub-pixel portion) to each other. In general, signals (a first auxiliary capacitance signal and a second auxiliary capacitance signal) which repeat a high potential and a low potential in a predetermined cycle with their phases shifted by 180 degrees relative to each other are provided to the first auxiliary capacitance wiring line and the second auxiliary capacitance wiring line. When the auxiliary capacitance wiring line short-circuiting circuit short-circuits (charge sharing) between the first auxiliary capacitance wiring line and the second auxiliary capacitance wiring line at timing at which the potentials of the first auxiliary capacitance signal and the second auxiliary capacitance signal are to change, charge is shared between the two wiring lines. Thus, the potentials of the two wiring lines change toward an intermediate value of the potentials of the two wiring lines immediately before the charge sharing. Since this potential change is made by the movement of charge between the first auxiliary capacitance wiring line and the second auxiliary capacitance wiring line, power consumption resulting from the potential change does not occur. After completion of the charge sharing, the potential of one of the first auxiliary capacitance wiring line and the second auxiliary capacitance wiring line changes to a high potential, and the potential of the other one changes to a low potential. The magnitude of the potential change at this time is smaller than the magnitude of a potential change in conventional configurations because the movement of charge is performed between the first auxiliary capacitance wiring line and the second auxiliary capacitance wiring line during the charge sharing period. Therefore, power consumption resulting from changing the potentials of the first auxiliary capacitance signal and the second auxiliary capacitance signal every predetermined period is smaller than that of conventional configurations. If a charge sharing period is sufficiently provided, the magnitude of the potential change of the first auxiliary capacitance wiring line and the second auxiliary capacitance wiring line after the charge sharing period ends is one-half compared to conventional configurations. Thus, the power consumption required to drive the first auxiliary capacitance signal and the second auxiliary capacitance signal is one-quarter compared to conventional configurations. As described above, in the liquid crystal display device adopting the pixel division scheme, power consumption is reduced over conventional devices. In addition, by the reduction in power consumption, the amount of heat generated in the device decreases. As a result, a reduction in display performance and a reduction in reliability caused by heat generation are suppressed.

According to the second aspect of the present invention, compared to a configuration in which charge sharing is performed on one edge side, in a direction (vertical direction) extending perpendicularly to the first auxiliary capacitance wiring line and the second auxiliary capacitance wiring line, of the liquid crystal panel substrate, the occurrence of a delay in charge sharing in the vertical direction (e.g., while charge sharing is performed rapidly on the lower-edge side of the liquid crystal panel substrate, charge sharing is performed slowly on the upper-edge side of the liquid crystal panel substrate) is suppressed.

According to the third aspect of the present invention, by a configuration in which the auxiliary capacitance wiring line short-circuiting circuit is provided on a board where the scanning signal line drive circuit is formed, the same effects as those obtained in the first aspect of the present invention and the second aspect of the present invention are obtained.

According to the fourth aspect of the present invention, a control signal to be provided to the auxiliary capacitance wiring line short-circuiting circuit is generated by the scanning signal line drive circuit, based on the timing of driving each scanning signal line. Hence, just by providing one control signal to the scanning signal line drive circuit, for example, a plurality of control signals whose levels change at timings sequentially delayed by one horizontal scanning period can be generated. By this, the number of control signal lines can be reduced over conventional devices.

According to the fifth aspect of the present invention, an increase in picture-frame size, etc., resulting from the provision of the auxiliary capacitance wiring line short-circuiting circuit are suppressed.

According to the sixth aspect of the present invention, compared to a configuration in which charge sharing is performed on one edge side, in a direction (vertical direction) extending perpendicularly to the first auxiliary capacitance wiring line and the second auxiliary capacitance wiring line, of the liquid crystal panel substrate, the occurrence of a delay in charge sharing in the vertical direction (e.g., while charge sharing is performed rapidly on the lower-edge side of the liquid crystal panel substrate, charge sharing is performed slowly on the upper-edge side of the liquid crystal panel substrate) is suppressed.

According to the seventh aspect of the present invention, by a configuration in which the auxiliary capacitance wiring line short-circuiting circuit is provided between the auxiliary capacitance main wiring lines, the same effects as those obtained in the first aspect of the present invention and the sixth aspect of the present invention are obtained.

According to the eighth aspect of the present invention, by a configuration in which the auxiliary capacitance wiring line short-circuiting circuit is provided between each of all pairs of the first auxiliary capacitance wiring line and the second auxiliary capacitance wiring line, the same effects as those obtained in the first aspect of the present invention and the sixth aspect of the present invention are obtained.

According to the ninth aspect of the present invention, charge sharing can be performed on a board where the first auxiliary capacitance signal and the second auxiliary capacitance signal are generated.

According to the tenth aspect of the present invention, the occurrence of abnormal operation caused by charge sharing is suppressed.

MODES FOR CARRYING OUT THE INVENTION

Embodiments of the present invention will be described below with reference to the accompanying drawings.

<1. First Embodiment>
<1.1 Overall Configuration>

Figure 2:
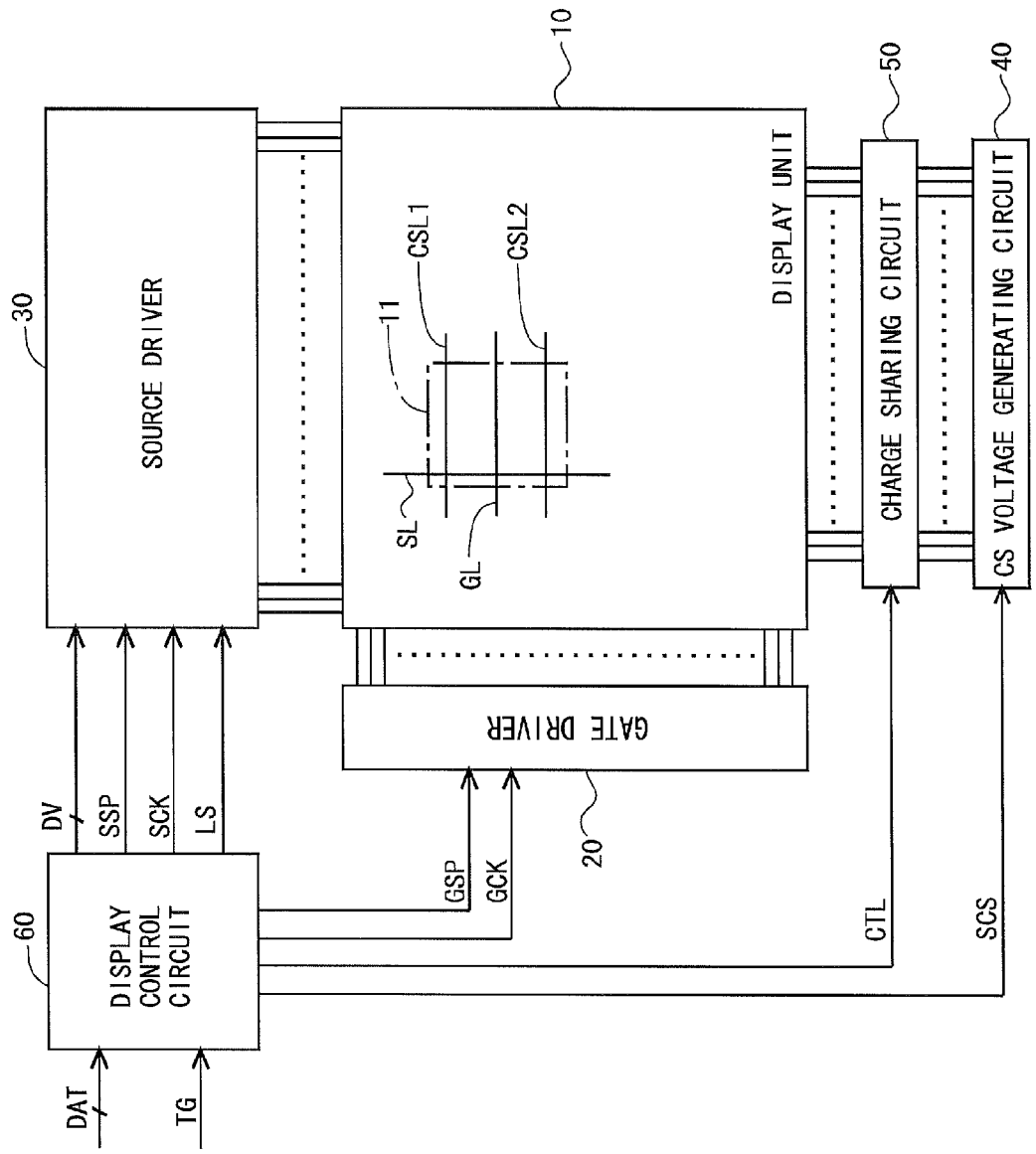
FIG. 2 is a block diagram showing a functional configuration of the liquid crystal display device in the first embodiment.

FIG. 2 is a block diagram showing a functional configuration of an active matrix-type liquid crystal display device according to a first embodiment of the present invention. As shown in FIG. 2, the liquid crystal display device includes a display unit 10, a gate driver (scanning signal line drive circuit) 20, a source driver (video signal line drive circuit) 30, a CS voltage generating circuit 40, a charge sharing circuit 50, and a display control circuit (also called a "liquid crystal controller", etc.) 60.

Figure 3:
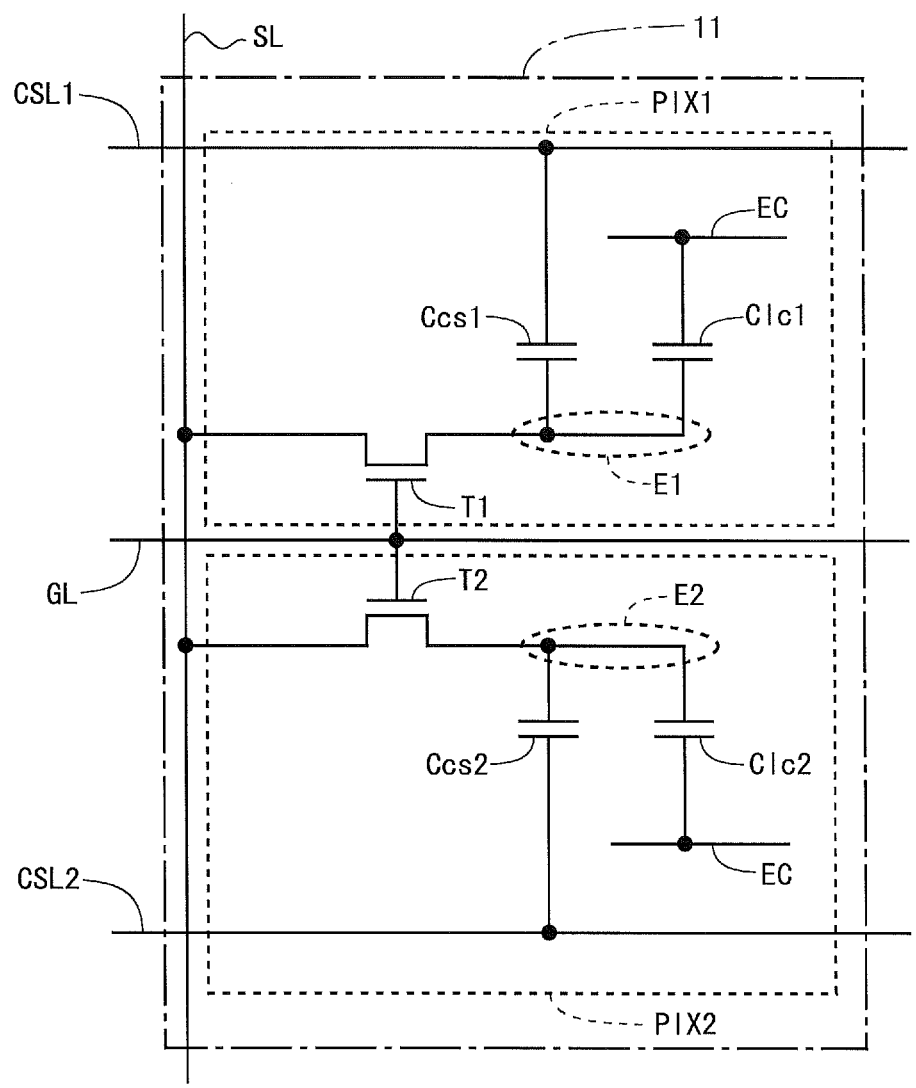
FIG. 3 is a circuit diagram showing a configuration of a pixel circuit of a liquid crystal display device adopting a pixel division scheme.

The display unit 10 is provided with a plurality of (m) source bus lines (video signal lines) extending from the source driver 30, a plurality of (n) gate bus lines (scanning signal lines) extending from the gate driver 20, a plurality of (2n) CS bus lines (auxiliary capacitance wiring lines), and a plurality of (n×m) pixel formation portions 11. FIG. 3 is a circuit diagram showing a configuration of a pixel circuit in the present embodiment. As with a conventional liquid crystal display device adopting the pixel division scheme, a pixel formation portion 11 forming one pixel is composed of two sub-pixel portions (a first sub-pixel portion PIX1 and a second sub-pixel portion PIX2). Both of the sub-pixel portions (PIX1 and PIX2) include thin-film transistors (T1 and T2) connected at their gate electrodes to a gate bus line GL and connected at their source electrodes to a source bus line SL; pixel electrodes (E1 and E2) connected to the drain electrodes of the thin-film transistors (T1 and T2); liquid crystal capacitances (Clc1 and Clc2) formed by a common electrode EC serving as a counter electrode and the pixel electrodes (E1 and E2); and auxiliary capacitances (Ccs1 and Ccs2) formed by the pixel electrodes (E1 and E2) and CS bus lines (CSL1 and CSL2). A constant potential Vcom is provided to the common electrode EC.

Figure 4:
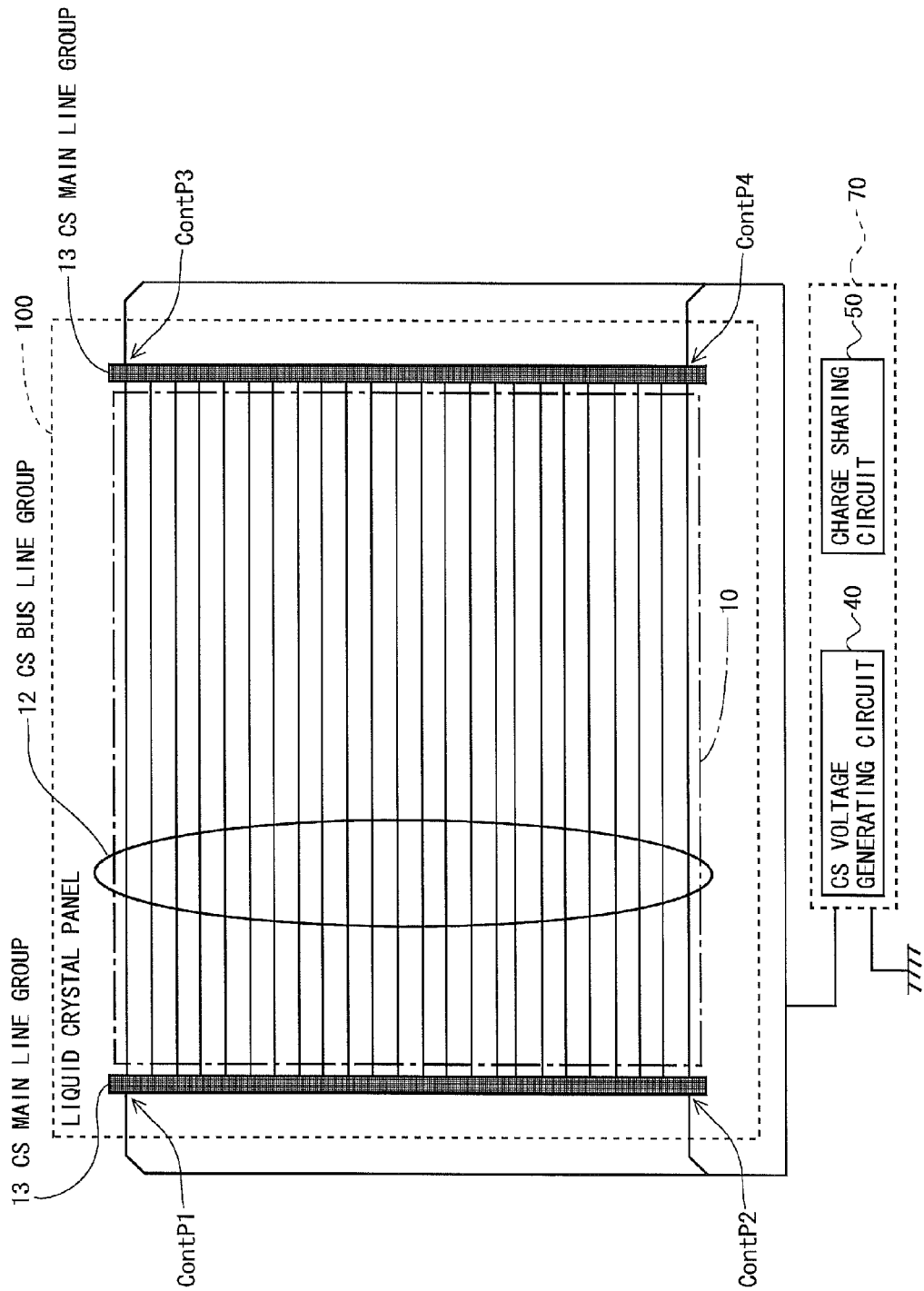
FIG. 4 is a diagram for describing the disposition of a charge sharing circuit in the first embodiment.
Figure 5:
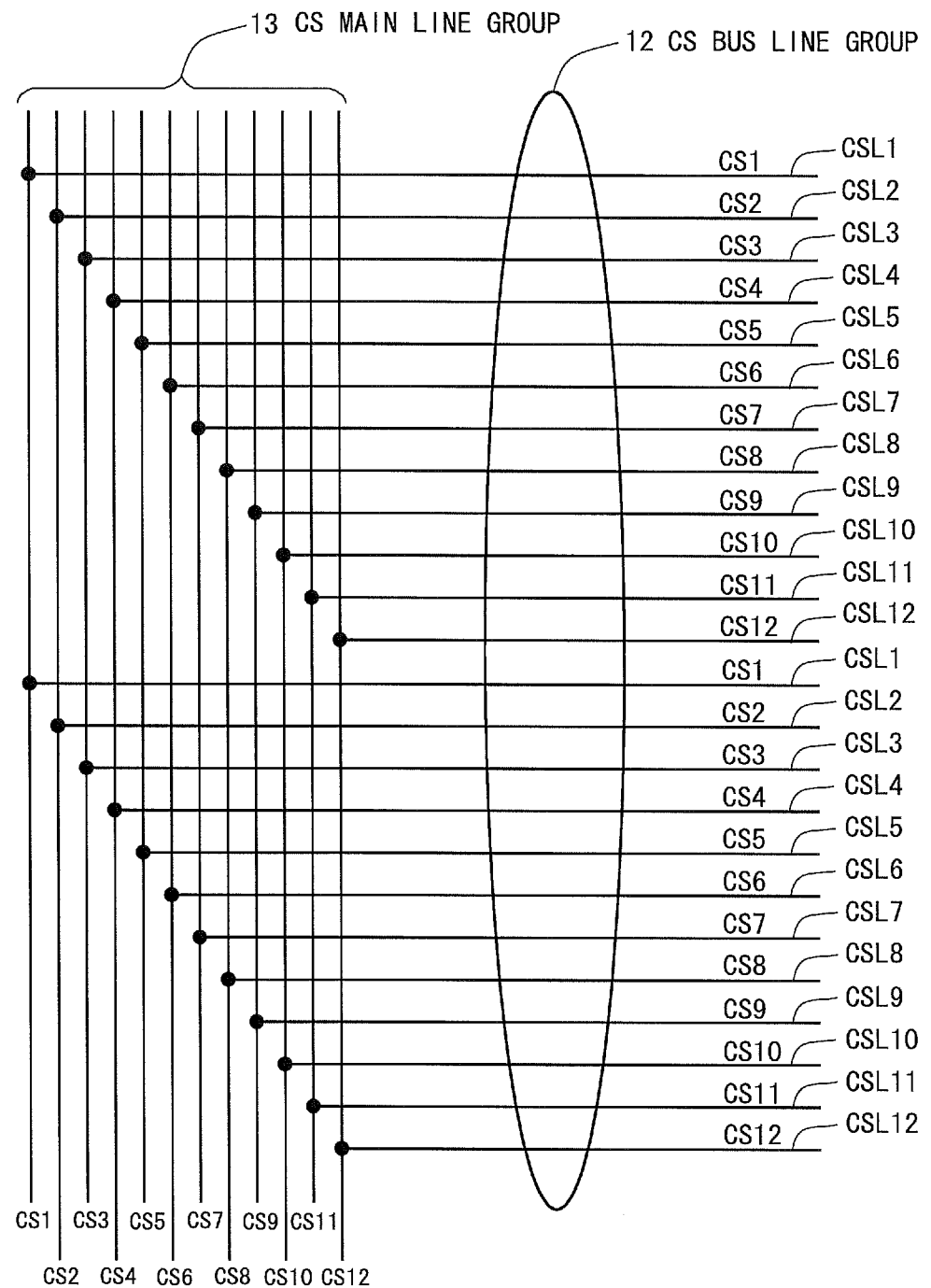
FIG. 5 is a diagram for describing a connection relationship between a CS main line group and a CS bus line group in the first embodiment.

Now, components related to the driving of the CS bus lines are taken a look at. As shown in FIG. 4, a CS bus line group 12 including a plurality of (2n) CS bus lines is arranged in the display unit 10 within a liquid crystal panel 100. The CS bus lines are arranged so as to extend in parallel with the gate bus lines. In addition, CS main line groups 13 each including a plurality of CS main lines (auxiliary capacitance main wiring lines) are arranged in regions outside the display unit 10, as components for supplying CS signals to the CS bus lines. The CS main lines are arranged so as to extend in parallel with the source bus lines. CS signals are supplied to the CS main line groups 13 from the CS voltage generating circuit 40 through, for example, four connecting points (ContP1 to ContP4) such as those shown in FIG. 4. A connection relationship between the CS main line group 13 and the CS bus line group 12 within the display unit 10 is, for example, such that shown in FIG. 5. In the example shown in FIG. 5, the CS main line group 13 is composed of 12 CS main lines. When taking a look at 12 CS bus lines CSL1 to CSL12 arranged consecutively within the display unit 10, the CS bus lines CSL1 to CSL12 are connected to different CS main lines. Such a connection relationship is repeated every 12 CS bus lines. Meanwhile, a CS signal CS1 supplied to the CS bus line CSL1 and a CS signal CS2 supplied to the CS bus line CSL2 are shifted in phase by 180 degrees relative to each other. Likewise, for the CS bus lines CSL3 to CSL12, too, with two CS bus lines as one set, the phases of two CS signals supplied to each set are shifted by 180 degrees relative to each other. In the following, description will be made taking a look at only the CS bus lines CSL1 and CSL2 among the 12 CS bus lines CSL1 to CSL12.

Next, the operation of the components shown in FIG. 2 will be described. The display control circuit 60 receives an image signal DAT and a timing signal group TG such as a horizontal synchronizing signal, a vertical synchronizing signal, and the like which sent from an external source, and outputs a digital video signal DV, a source start pulse signal SSP, a source clock signal SCK, and a latch strobe signal LS for controlling the operation of the source driver 30, a gate start pulse signal GSP and a gate clock signal GCK for controlling the operation of the gate driver 20, a CS control signal SCS for controlling the operation of the CS voltage generating circuit 40, and a short-circuit control signal CTL for controlling the operation of the charge sharing circuit 50.

The source driver 30 receives the digital video signal DV, the source start pulse signal SSP, the source clock signal SCK, and the latch strobe signal LS which are outputted from the display control circuit 60, and applies driving video signals to the respective source bus lines. The gate driver 20 receives the gate start pulse signal GSP and the gate clock signal GCK which are outputted from the display control circuit 60, and applies scanning signals to the gate bus lines, respectively. The CS voltage generating circuit 40 generates CS signals whose potentials change every predetermined period, based on the CS control signal SCS outputted from the display control circuit 60. The CS signals generated by the CS voltage generating circuit 40 are supplied to the CS bus lines CSL1 to CSL12 within the display unit 10 through the CS main line groups 13. The charge sharing circuit 50 short-circuits two CS bus lines to which CS signals are supplied, the CS signals being shifted in phase by 180 degrees relative to each other, based on a short-circuit control signal CTL.

In the above-described manner, driving video signals are applied to the respective source bus lines, scanning signals are applied to the respective gate bus lines, and CS signals are applied to the respective CS bus lines, by which an image based on the image signal DAT sent from the external source is displayed on the display unit 10.

Note that in the present embodiment a first pixel electrode is implemented by the pixel electrode E1, a second pixel electrode is implemented by the pixel electrode E2, a first auxiliary capacitance is implemented by the auxiliary capacitance Ccs1, and a second auxiliary capacitance is implemented by the auxiliary capacitance Ccs2. Note also that a first auxiliary capacitance wiring line is implemented by the CS bus line CSL1, a second auxiliary capacitance wiring line is implemented by the CS bus line CSL2, a first auxiliary capacitance signal is implemented by the CS signal CS1, and a second auxiliary capacitance signal is implemented by the CS signal CS2. Note also that an auxiliary capacitance signal generating circuit is implemented by the CS voltage generating circuit 40, and an auxiliary capacitance wiring line short-circuiting circuit is implemented by the charge sharing circuit 50. Note also that an auxiliary capacitance wiring line pair is implemented by two CS bus lines to which CS signals are supplied, the CS signals being shifted in phase by 180 degrees relative to each other.

<1.2 Configuration of the Main Part>

Figure 1:
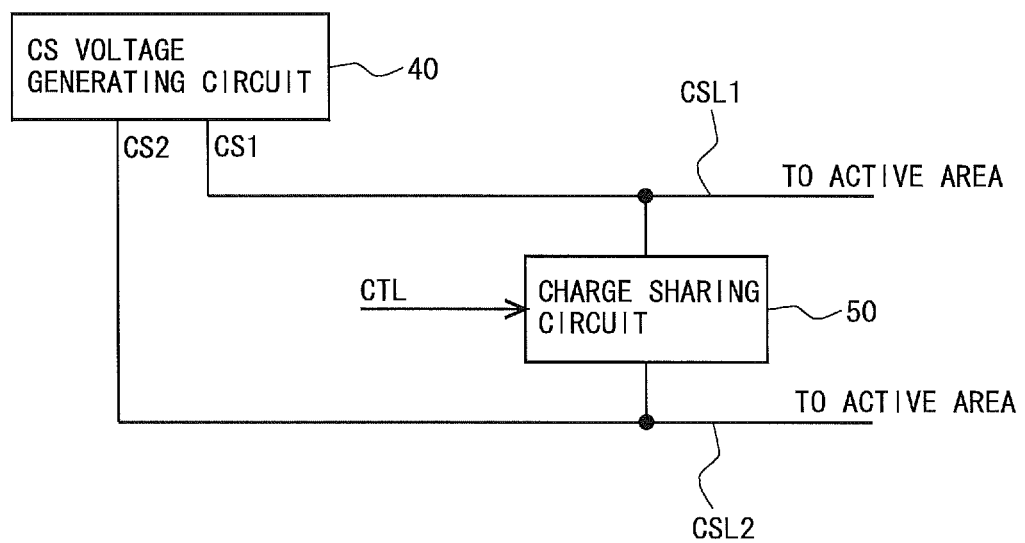
FIG. 1 is a schematic configuration diagram of the main part of an active matrix-type liquid crystal display device according to a first embodiment of the present invention.

FIG. 1 is a schematic configuration diagram of the main part of the liquid crystal display device according to the present embodiment. CS signals CS1 and CS2 are supplied to the CS bus lines CSL1 and CSL2, respectively, from the CS voltage generating circuit 40. Each CS signal alternately repeats a potential having a level higher by a predetermined magnitude than the potential Vcom of the common electrode (hereinafter, also referred to as the "maximum potential") and a potential having a level lower by a predetermined magnitude than the potential Vcom of the common electrode (hereinafter, also referred to as the "minimum potential"), every predetermined period. The CS signal CS1 and the CS signal CS2 are shifted in phase by 180 degrees relative to each other. Therefore, when the maximum potential is provided to the CS bus line CSL1, the minimum potential is provided to the CS bus line CSL2, and when the minimum potential is provided to the CS bus line CSL1, the maximum potential is provided to the CS bus line CSL2.

In order that the CS bus line CSL1 and the CS bus line CSL2 configured in the above-described manner can be short-circuited, the liquid crystal display device is provided with a charge sharing circuit 50. A short-circuit control signal CTL is provided to the charge sharing circuit 50 from the display control circuit 60. In the present embodiment, when the short-circuit control signal CTL is at a high level, the charge sharing circuit 50 short-circuits the CS bus line CSL1 and the CS bus line CSL2.

Meanwhile, when a short circuit is made between the CS bus line CSL1 and the CS bus line CSL2, a total charge of charge of the CS bus line CSL1 before the short circuit and charge of the CS bus line CSL2 before the short circuit is shared between the CS bus line CSL1 and the CS bus line CSL2. Therefore, in the present description, short-circuiting the CS bus line CSL1 and the CS bus line CSL2 is called "charge sharing", and a circuit for performing charge sharing is called a "charge sharing circuit".

Figure 6:
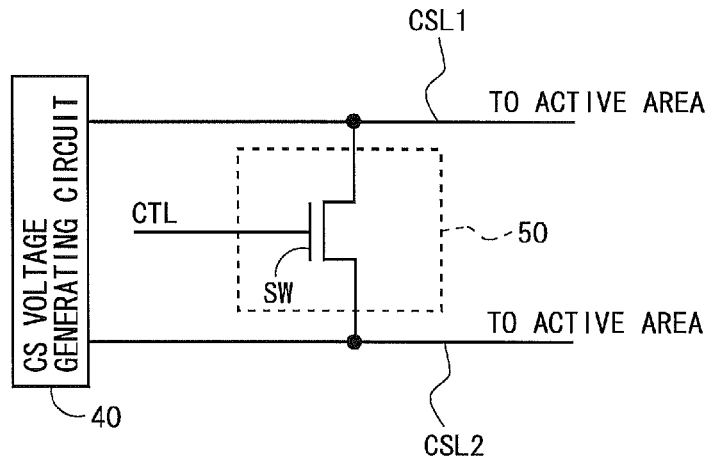
FIG. 6 is a circuit diagram showing a configuration of a charge sharing circuit in the first embodiment.

FIG. 6 is a circuit diagram showing a configuration of the charge sharing circuit 50 in the present embodiment. In the present embodiment, the charge sharing circuit 50 is implemented by being provided with an NMOS transistor SW connected at its one of the conduction terminals to the CS bus line CSL1 and connected at its other conduction terminal to the CS bus line CSL2. A short-circuit control signal CTL is provided to the control terminal of the NMOS transistor SW. By such a configuration, the NMOS transistor SW functions as a switch. Note that the charge sharing circuit 50 may be implemented using a PMOS transistor or may be implemented by a CMOS configuration using both an NMOS and a PMOS (the same also applies to variants which will be described later).

In the configuration shown in FIG. 6, when the short-circuit control signal CTL is at a low level, the NMOS transistor SW is placed in an off state. Therefore, the CS bus line CSL1 and the CS bus line CSL2 are in an electrically disconnected state. On the other hand, when the short-circuit control signal CTL is at a high level, the NMOS transistor SW is placed in an on state. Therefore, the CS bus line CSL1 and the CS bus line CSL2 are in an electrically connected state, and thus, charge is shared between the CS bus line CSL1 and the CS bus line CSL2.

<1.3 Disposition of the Charge Sharing Circuit>

Next, with reference to FIG. 4, the disposition of the charge sharing circuit 50 in the present embodiment will be described. In the present embodiment, on a board 70 in which the CS voltage generating circuit 40 is provided, the charge sharing circuit 50 is also provided. Specifically, as shown in FIG. 4, the CS voltage generating circuit 40 and the charge sharing circuit 50 are provided on the board 70 provided near one edge side, in a direction in which the CS main line groups 13 extend, of the edge portions of a substrate composing the liquid crystal panel 100. By such a configuration, in the present embodiment, charge sharing is performed on the board 70 in which the CS voltage generating circuit 40 is provided. Note that the board 70 is, for example, an FPC (Flexible Printed Circuit).

<1.4 Drive Method>

Figure 7:
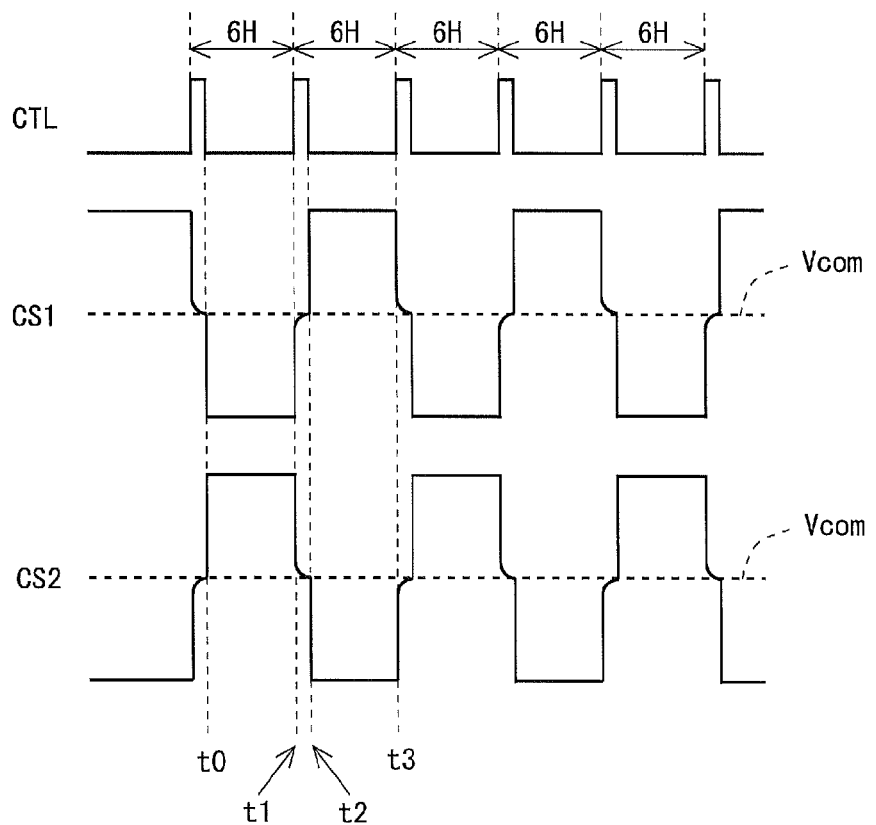
FIG. 7 is a signal waveform diagram for describing a drive method for CS bus lines in the first embodiment.

FIG. 7 is a signal waveform diagram for describing a drive method for CS bus lines. The CS voltage generating circuit 40 outputs CS signals which alternately repeat the maximum potential and the minimum potential every predetermined period (here, every six horizontal scanning periods). The display control circuit 60 outputs a short-circuit control signal CTL which goes to a high level for a relatively short period every predetermined period (here, every six horizontal scanning periods) as shown in FIG. 7. Here, the period from time point t0 to time point t3 is taken a look at. During the period from time point t0 to time point t1, the short-circuit control signal CTL is maintained at a low level, and the potential of a CS signal CS1 is the minimum potential and the potential of a CS signal CS2 is the maximum potential. Upon reaching time point t1, the short-circuit control signal CTL changes from the low level to the high level. The state in which the short-circuit control signal CTL is brought to the high level is maintained until time point t2. By this, during the period from time point t1 to time point t2 (hereinafter, referred to as a "charge sharing period"), the CS bus line CSL1 and the CS bus line CSL2 are placed in an electrically connected state. By this, during the charge sharing period, the potential of the CS signal CS1 on the CS bus line CSL1 and the potential of the CS signal CS2 on the CS bus line CSL2 change toward an intermediate value of the potentials of the two signals immediately before time point t1. If the charge sharing period is sufficiently provided, the potential of the CS signal CS1 and the potential of the CS signal CS2 become equal to an intermediate potential between the maximum potential and the minimum potential, i.e., the common electrode potential Vcom. Note that in order to prevent the occurrence of abnormal operation caused by charge sharing, it is preferred to stop outputting the CS signals from the CS voltage generating circuit 40 during the charge sharing period.

Upon reaching time point t2, the short-circuit control signal CTL changes from the high level to the low level. By this, the CS bus line CSL1 and the CS bus line CSL2 are placed in an electrically disconnected state. As a result, the potential of the CS signal CS1 changes to the maximum potential, and the potential of the CS signal CS2 changes to the minimum potential. Thereafter, upon reaching time point t3, the short-circuit control signal CTL changes from the low level to the high level again, by which charge sharing is performed. Operation such as that described above is repeated during the operation of the liquid crystal display device.

<1.5 Effects>

According to the present embodiment, in a liquid crystal display device adopting the pixel division scheme, two CS bus lines to which CS signals which are shifted in phase by 180 degrees relative to each other are supplied are short-circuited at timing at which a change of the potentials of the CS signals (a change from the maximum potential to the minimum potential or a change from the minimum potential to the maximum potential) is to be made. By this, charge is shared between the two CS bus lines, and accordingly, the potentials of the CS signals on the two CS bus lines change toward an intermediate value of the potentials of the CS signals immediately before the short circuit. Since this potential change of the CS signals is made by the movement of charge between the two CS bus lines, power consumption resulting from the potential change does not occur. After the charge sharing period ends, the potential of each CS signal changes to the maximum potential or the minimum potential. The magnitude of the potential change at this time is smaller than the magnitude of the potential change (a change from the maximum potential to the minimum potential or a change from the minimum potential to the maximum potential) in conventional configurations because the movement of charge is performed between the two CS bus lines during the charge sharing period. Therefore, power consumption resulting from changing the potentials of the CS signals every predetermined period is smaller than that of conventional configurations.

When a sufficient charge sharing period is provided, by charge sharing, the potentials of the CS signals on the two CS bus lines reach an intermediate potential between the maximum potential and the minimum potential of the CS signals. Then, after the charge sharing period ends, each CS signal changes from the intermediate potential to the maximum potential or changes from the intermediate potential to the minimum potential. The magnitude of the potential change at this time is one-half of the magnitude of the potential change in conventional configurations. Therefore, power consumption P2 resulting from changing the potentials of the CS signals every predetermined period is as shown in the following equation (2):

$$P2 = C \times (Vpp/2)^2 \times f \qquad (2)$$

where C is the capacitance value of the CS bus line, Vpp is the voltage amplitude of the CS signal, and f is the frequency of the CS signal.

It is grasped from the above equations (1) and (2) that P2 is one-quarter of P1. That is, in the present embodiment, when a charge sharing period is sufficiently provided, the power consumption required to drive a CS signal is one-quarter compared to conventional configurations. Note that even when a charge sharing period is not sufficiently provided, since the potential of the CS signal changes toward an intermediate potential during the charge sharing period without causing power consumption, the power consumption required to drive the CS signal is lower than that of conventional configurations.

As described above, according to the present embodiment, in a liquid crystal display device adopting the pixel division scheme, power consumption is reduced over conventional devices. In addition, by the reduction in power consumption, the amount of heat generated in the device decreases. As a result, a reduction in display performance and a reduction in reliability caused by heat generation are suppressed.

<1.6 Variant>

Figure 8:
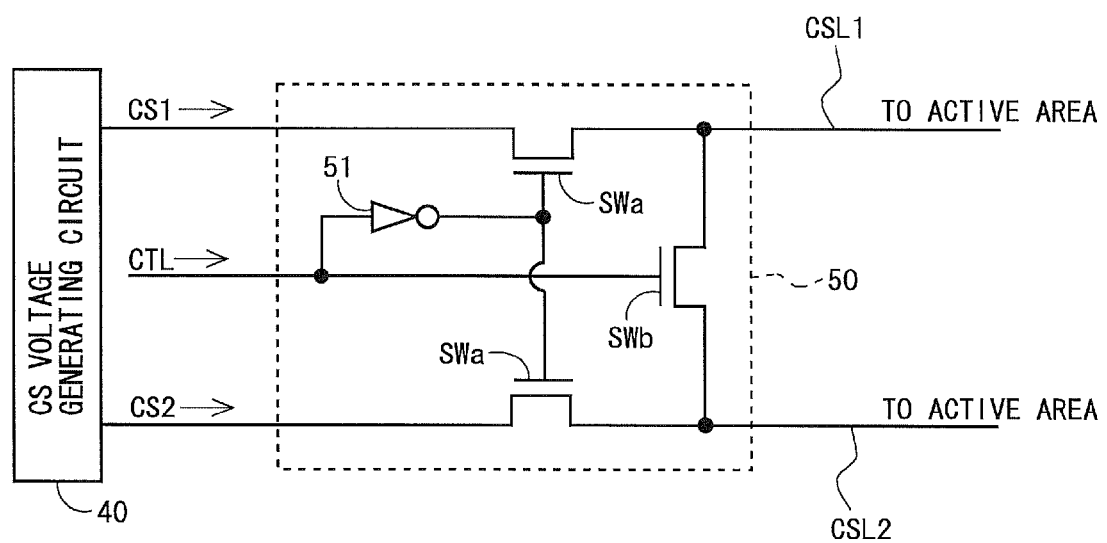
FIG. 8 is a circuit diagram showing a configuration of a charge sharing circuit in a variant of the first embodiment.

Although in the above-described first embodiment, the charge sharing circuit 50 is configured as shown in FIG. 6, the present invention is not limited thereto. The charge sharing circuit 50 may be configured, for example, as shown in FIG. 8. In the present variant, there are provided first NMOS transistors SWa connected at their respective ones of the conduction terminals to the CS voltage generating circuit 40 and connected at their respective other conduction terminals to CS bus lines CSL1 and CSL2 in an active area, respectively. CS signals CS1 and CS2 outputted from the CS voltage generating circuit 40 are supplied to the CS bus lines CSL1 and CSL2 in the active area through the first NMOS transistors SWa. In addition, the two CS bus lines CSL1 and CSL2 to which the CS signals CS1 and CS2 which are shifted in phase by 180 degrees relative to each other are supplied are connected to each other through a second NMOS transistor SWb. A short-circuit control signal CTL is provided to the control terminal of the second NMOS transistor SWb. An output signal from an inverter 51, i.e., a logically inverted signal of the short-circuit control signal CTL, is provided to the control terminals of the first NMOS transistors SWa.

By the above-described configuration, when the short-circuit control signal CTL is at a low level, the first NMOS transistors SWa are placed in an on state, and the second NMOS transistor SWb is placed in an off state. Therefore, the potentials of the CS signals CS1 and CS2 outputted from the CS voltage generating circuit 40 are provided to the CS bus lines CSL1 and CSL2 in the active area. On the other hand, when the short-circuit control signal CTL is at a high level, the first NMOS transistors SWa are placed in an off state, and the second NMOS transistor SWb is placed in an on state. Accordingly, charge sharing is performed between the CS bus line CSL1 and the CS bus line CSL2.

According to the present variant, during a charge sharing period, the charge sharing circuit 50 and the CS bus lines in the active area are electrically disconnected to each other. Hence, without stopping outputting CS signals from the CS voltage generating circuit 40 during the charge sharing period, charge sharing is normally performed between two CS bus lines in each set in the active area.

<2. Second Embodiment>
<2.1 Disposition of the Charge Sharing Circuit>

Figure 9:
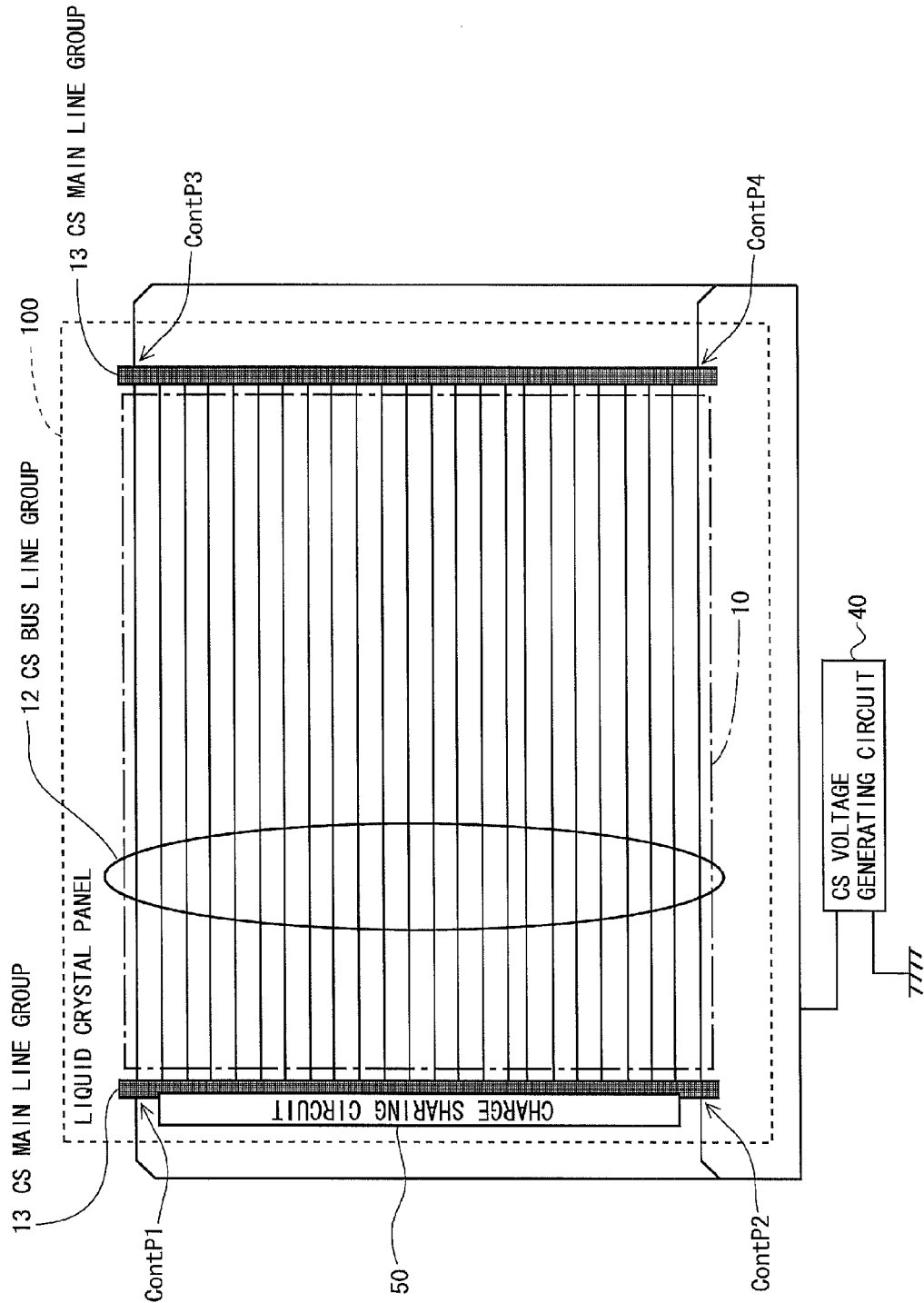
FIG. 9 is a diagram for describing the disposition of charge sharing circuit in the second embodiment.

FIG. 9 is a diagram for describing the disposition of the charge sharing circuit 50 in a second embodiment of the present invention. Note that the overall configuration, the configuration of the main part, and the drive method are the same as those of the first embodiment and thus description thereof is omitted (see FIGS. 1 to 3 and FIGS. 5 to 7).

Figure 10:
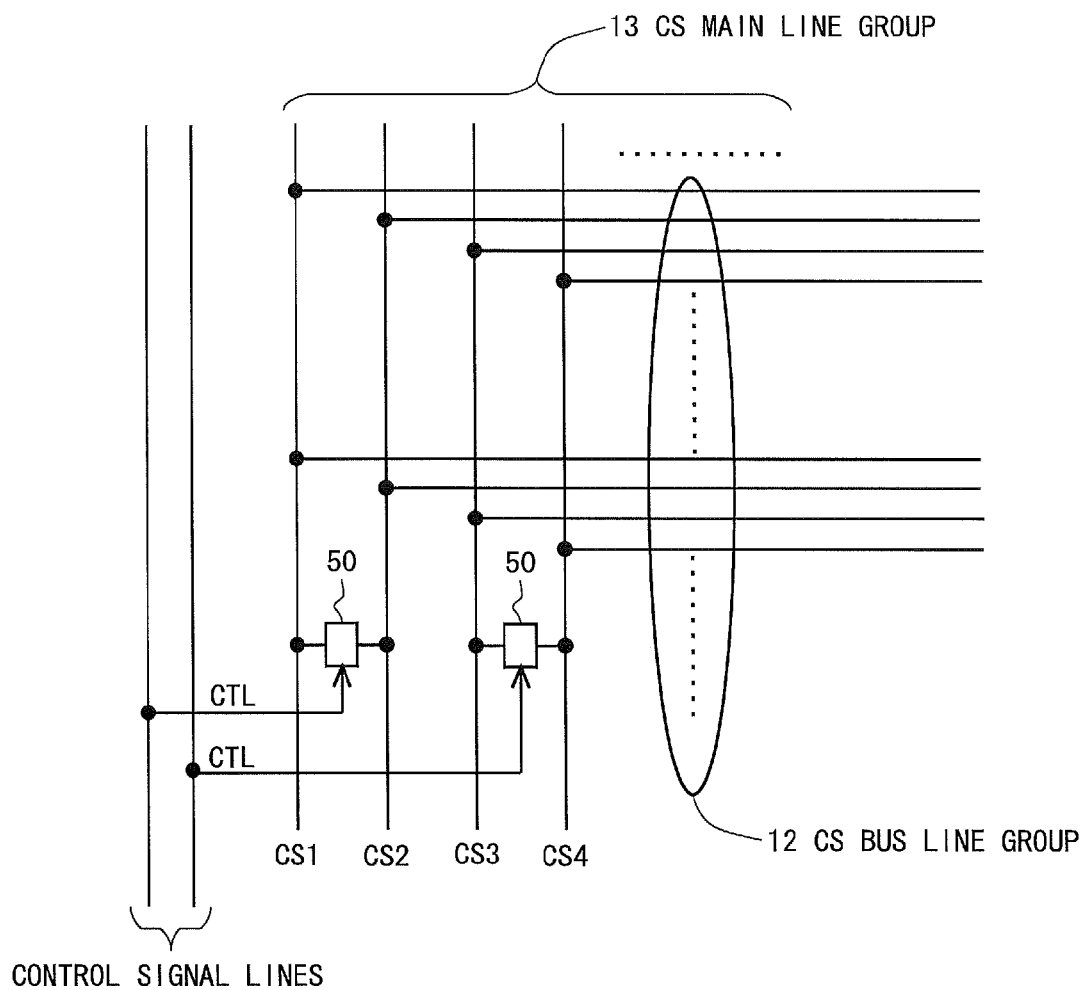
FIG. 10 is a diagram for describing a detailed disposition of charge sharing circuits in the second embodiment.

In the present embodiment, the charge sharing circuit 50 is monolithically formed on a substrate composing a liquid crystal panel 100, using TFT (Thin-Film transistors). Specifically, the charge sharing circuit 50 is provided near a region where a CS main line group 13 is arranged in the region of the substrate composing the liquid crystal panel 100. More specifically, as shown in FIG. 10, the charge sharing circuit 50 is provided so that two CS main lines for transmitting CS signals whose phases are shifted by 180 degrees relative to each other can be short-circuited to each other. A short-circuit control signal CTL to be provided to the charge sharing circuit 50 is supplied, for example, from a display control circuit 60 provided on a board external to the liquid crystal panel 100, through a control signal line arranged so as to extend in parallel with the CS main line group 13. Note that although FIG. 9 exemplifies a configuration in which the charge sharing circuit 50 is provided only on one edge side of the liquid crystal panel 100, the charge sharing circuit 50 may be provided on both the one edge side and other edge side of the liquid crystal panel 100. By doing so, signal delay is reduced.

<2.2 Effects>

According to the present embodiment, as with the above-described first embodiment, in a liquid crystal display device adopting the pixel division scheme, power consumption is reduced over conventional devices. In addition, by the reduction in power consumption, the amount of heat generated in the device decreases. Accordingly, a reduction in display performance and a reduction in reliability caused by heat generation are suppressed.

In addition, according to the present embodiment, a short circuit (charge sharing) between CS main lines is made by a charge sharing circuit 50 formed monolithically within the liquid crystal panel 100. Thus, compared to a configuration (the configuration of the first embodiment) in which charge sharing is performed on one edge side, in a direction in which CS main line groups 13 extend, of the liquid crystal panel 100, the occurrence of a delay in charge sharing in a vertical direction (vertical direction in FIG. 9) (e.g., while charge sharing is performed rapidly on the lower-edge side of the liquid crystal panel 100, charge sharing is performed slowly on the upper-edge side of the liquid crystal panel 100) is suppressed. Note that ideally it is sufficient to provide one charge sharing circuit 50 per one set of CS main lines (i.e., two CS main lines). However, depending on the panel size or the panel resolution, by providing a larger number of charge sharing circuits 50 per set of CS main lines, the occurrence of a delay in charge sharing is effectively suppressed.

<2.3 Variant>

Figure 11:
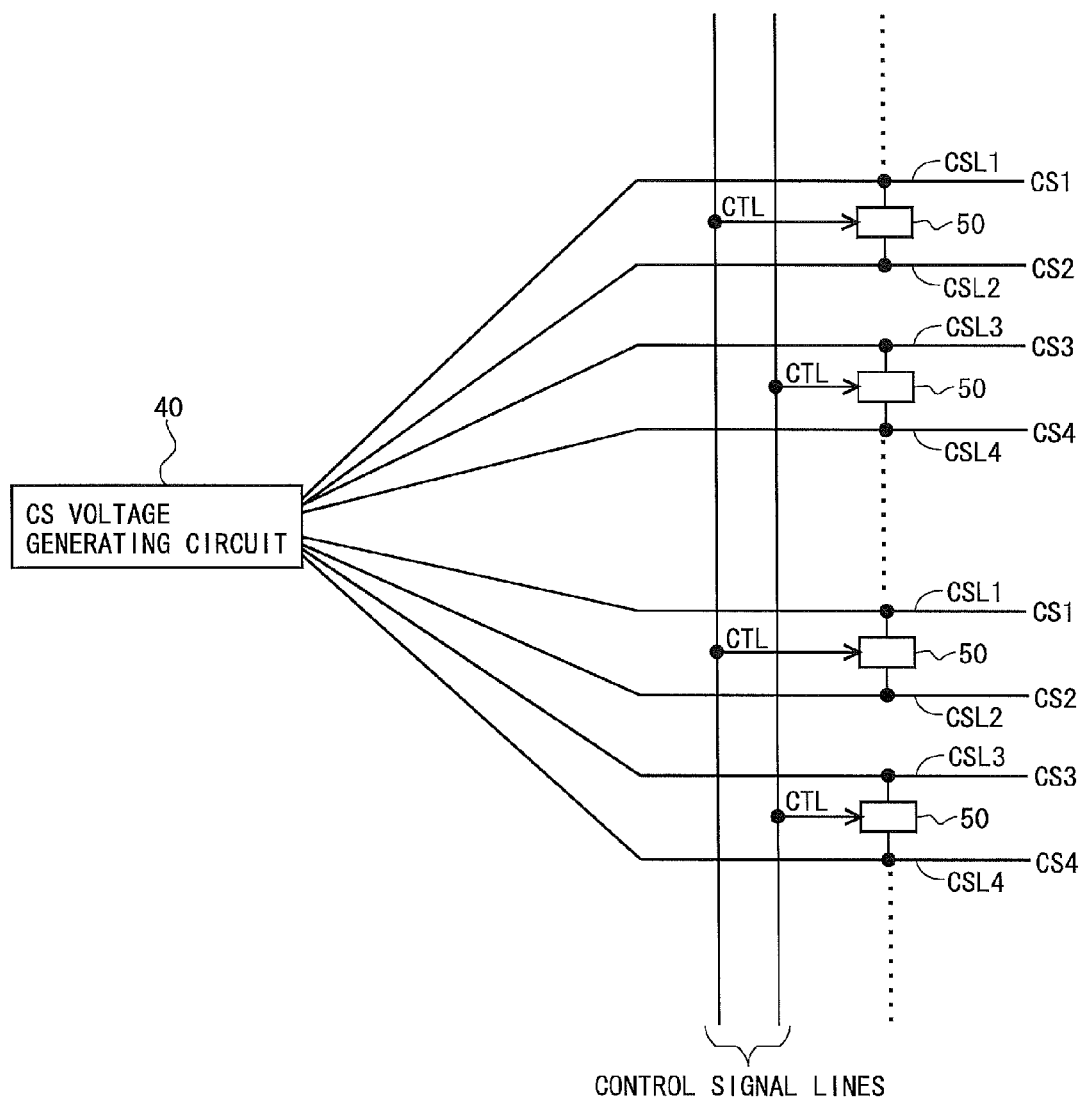
FIG. 11 is a diagram for describing a detailed disposition of charge sharing circuits in a variant of the second embodiment.

FIG. 11 is a diagram for describing a detailed disposition of charge sharing circuits 50 in a variant of the above-described second embodiment. In the present variant, as with the second embodiment, the charge sharing circuit 50 is monolithically formed on a substrate composing a liquid crystal panel 100, using TFT (Thin-Film transistors). Note, however, that in the present variant, unlike the second embodiment, one charge sharing circuit 50 is provided for each set of CS bus lines (i.e., two CS bus lines) for all those CS bus lines extending from an active area. A short-circuit control signal CTL to be provided to the charge sharing circuit 50 is supplied, for example, from a display control circuit 60 provided on a board external to the liquid crystal panel 100, through a control signal line arranged so as to extend in a direction perpendicular to the CS bus lines within a display unit 10.

Figure 12:
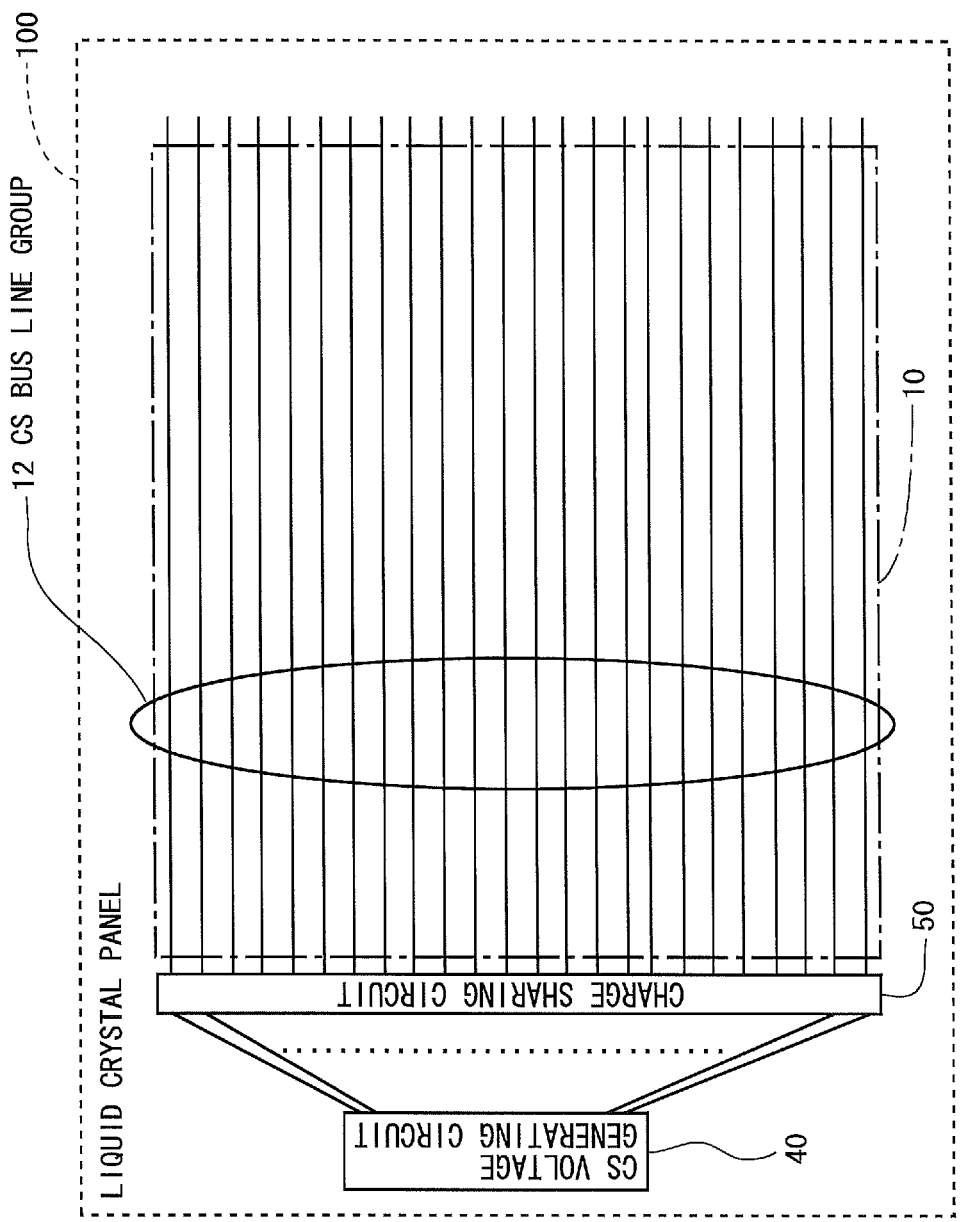
FIG. 12 is a diagram showing an exemplary configuration of a liquid crystal display device in which CS main lines are not formed within a liquid crystal panel in a variant of the second embodiment.

Meanwhile, the configuration according to the present variant is typically adopted in the case in which CS main lines are not formed within the liquid crystal panel 100. For example, as shown in FIG. 12, there is a liquid crystal display device in which a CS voltage generating circuit 40 is formed within a liquid crystal panel 100. Such a liquid crystal display device is not provided with CS main lines. Hence, since the configuration of the second embodiment (the configuration shown in FIG. 10) cannot be adopted, the configuration according to the present variant is adopted.

<3. Third Embodiment>
<3.1 Disposition of Charge Sharing Circuits>

Figure 13:
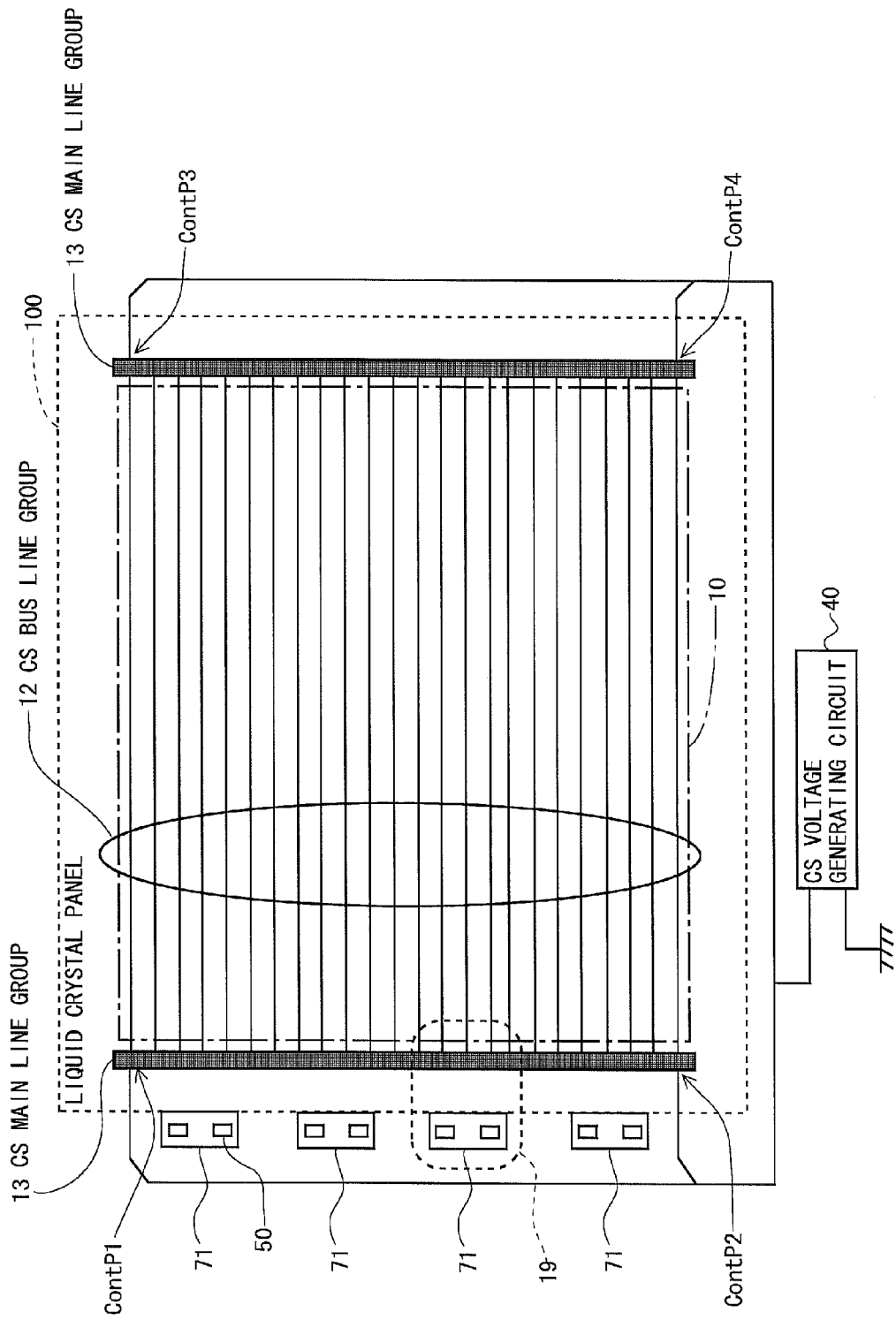
FIG. 13 is a diagram for describing the disposition of the charge sharing circuits in a third embodiment of the present invention.

FIG. 13 is a diagram for describing the disposition of charge sharing circuits 50 in a third embodiment of the present invention. Note that the overall configuration, the configuration of the main part, and the drive method are the same as those of the first embodiment and thus description thereof is omitted (see FIGS. 1 to 3 and FIGS. 5 to 7).

In the present embodiment, the charge sharing circuit 50 is formed on a board 71 provided external to a liquid crystal panel 100. Specifically, as shown in FIG. 13, an IC chip (not shown) including the charge sharing circuit 50 is mounted on a board 71 connected to an edge portion on one edge side, in a direction in which a CS bus line group 12 extends, of the edge portions of a substrate composing the liquid crystal panel 100. Note that the board 71 is, for example, an FPC (Flexible Printed Circuit). Note also that although FIG. 13 exemplifies a configuration in which the charge sharing circuit 50 is provided only on the board on one edge side of the liquid crystal panel 100, the charge sharing circuits 50 may be provided on boards on both the one edge side and other edge side of the liquid crystal panel 100. By doing so, signal delay is reduced.

Figure 14:
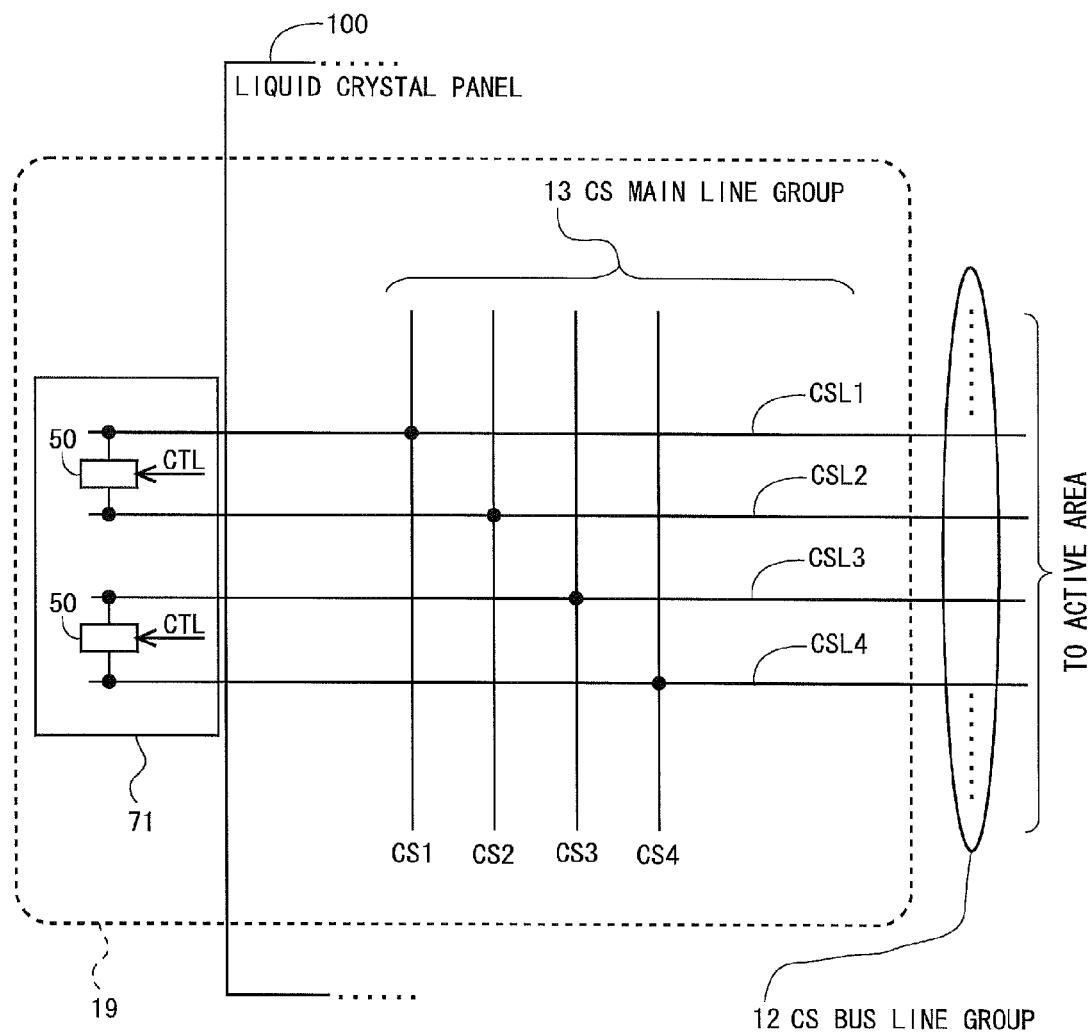
FIG. 14 is a diagram for describing a connection relationship between CS bus lines, CS main lines, and charge sharing circuits in the third embodiment.

Now, with reference to FIG. 14, a connection relationship between CS bus lines, CS main lines, and charge sharing circuits 50 will be described. The CS bus lines and the CS main lines are connected in the same manner as in the above-described first embodiment. In the present embodiment, the charge sharing circuit 50 is provided on one edge side, in a direction in which the CS bus line group 12 extends, of the liquid crystal panel 100, instead of being provided on one edge side, in a direction in which a CS main line group 13 extends, of the liquid crystal panel 100. Hence, each CS bus line extending from an active area to a region where the CS main line group 13 is arranged is arranged so as to further extend onto a board 71 in which an IC chip including the charge sharing circuit 50 is mounted. In such a configuration, two CS bus lines to which CS signals which are shifted in phase by 180 degrees relative to each other are supplied are short-circuited by the charge sharing circuit 50 within the board 71.

<3.2 Effects>

According to the present embodiment, as with the above-described first embodiment, in a liquid crystal display device adopting the pixel division scheme, power consumption is reduced over conventional devices. In addition, by the reduction in power consumption, the amount of heat generated in the device decreases. Accordingly, a reduction in display performance and a reduction in reliability caused by heat generation are suppressed. Furthermore, since charge sharing is performed on one edge side, in a direction in which the CS bus line group 12 extends, of the liquid crystal panel 100, as with the above-described second embodiment, the occurrence of a delay in charge sharing in a vertical direction (vertical direction in FIG. 13) of the liquid crystal panel 100 is suppressed.

<3.3 Variant, Etc.>

Figure 15:
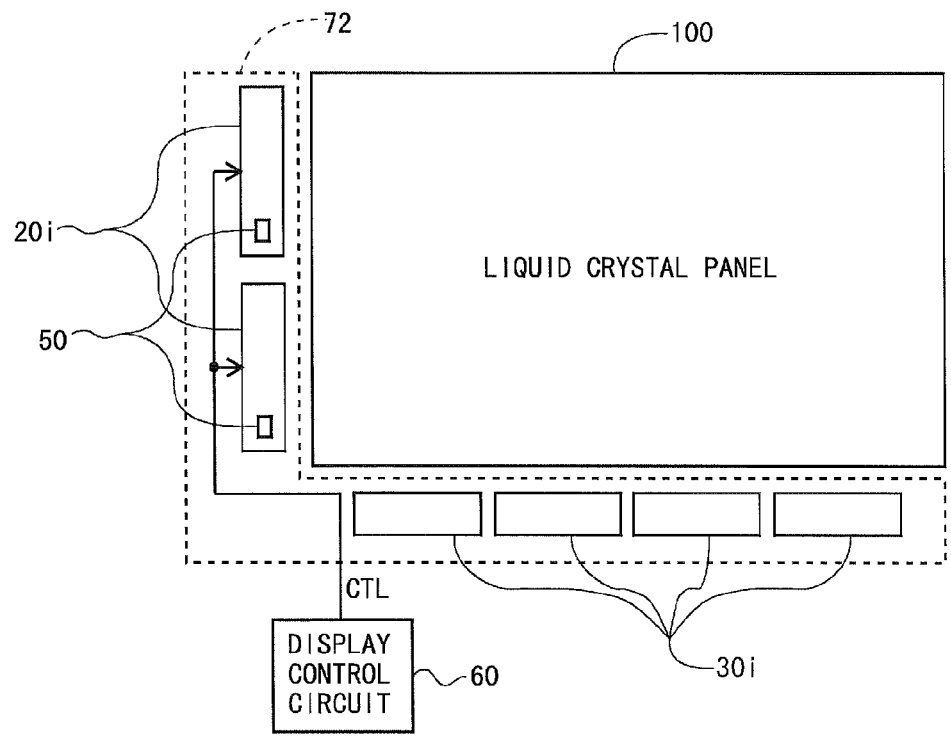
FIG. 15 is a diagram for describing the arrangement of control signal lines for when gate driver IC chips and source driver IC chips are mounted on one board, in a variant of the third embodiment.
Figure 16:
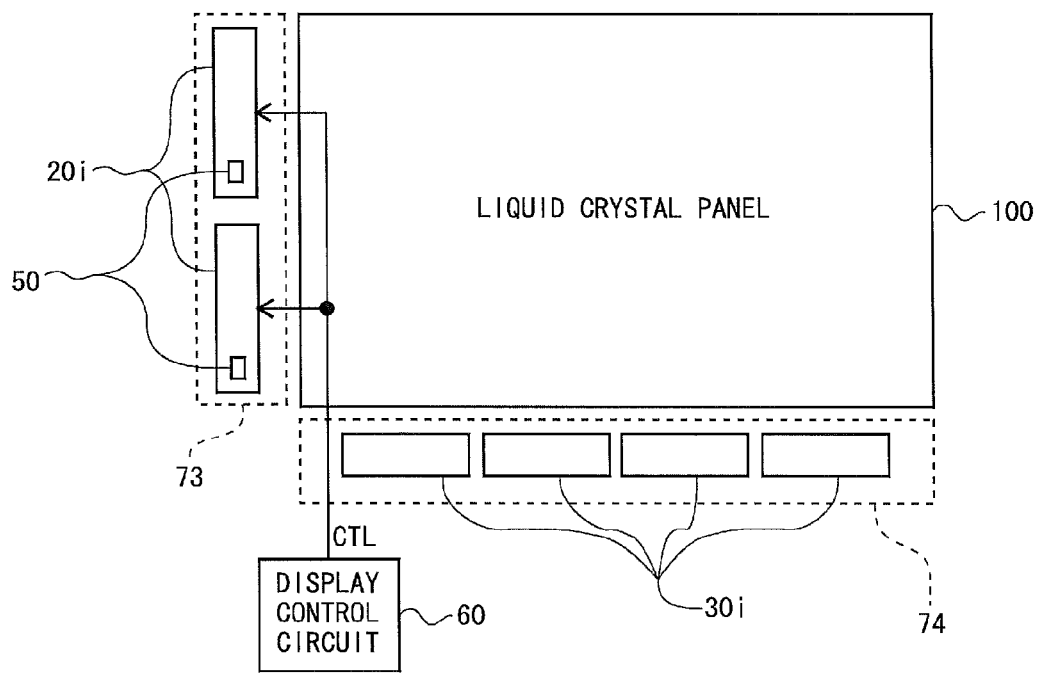
FIG. 16 is a diagram for describing the arrangement of control signal lines for when gate driver IC chips and source driver IC chips are mounted on different boards, in a variant of the third embodiment.

Although in the description of the above-described third embodiment, a relationship between an IC chip including the charge sharing circuit 50 and a gate driver IC chip (an IC chip having the function of a gate driver 20) is not particularly mentioned, an IC chip including the charge sharing circuit 50 and a gate driver IC chip may be provided on the same board. Furthermore, it may be configured such that the charge sharing circuit 50 is included in a gate driver IC chip. In the case of adopting this configuration, when gate driver IC chips 20*i* and source driver IC chips 30*i* (IC chips having the function of a source driver 30) are mounted on one board 72 as shown in FIG. 15, the short-circuit control signal CTL is supplied to the charge sharing circuit 50 from a display control circuit 60 through the control signal line arranged on the board 72. On the other hand, when gate driver IC chips 20*i* and source driver IC chips 30*i* are mounted on different boards 73 and 74 as shown in FIG. 16, the short-circuit control signal CTL is supplied to the charge sharing circuit 50 from a display control circuit 60 through the control signal line arranged on the board 74 in which the source driver IC chips 30*i* are mounted and on a substrate composing a liquid crystal panel 100.

Meanwhile, by a configuration in which the short-circuit control signal to be supplied to the charge sharing circuit 50 are generated in the gate driver 20 (typically, a configuration in which the charge sharing circuit 50 is included in the gate driver IC chip 20*i*, as in the present variant), the effect of reducing the number of control signal lines is obtained, which will be described with reference to FIGS. 17 and 18. Note that in FIGS. 17 and 18, a control signal sent to the gate driver 20 from the display control circuit 60 is denoted by reference character SCTL. Note also that in a configuration shown in FIG. 17, a CS bus line CSL1 and a CS bus line CSL2 are of the same set, a CS bus line CSL3 and a CS bus line CSL4 are of the same set, and a CS bus line CSL5 and a CS bus line CSL6 are of the same set, and short-circuit control signals for the respective sets are denoted by reference characters CTL (1, 2), CTL (3, 4), and CTL (5, 6), respectively.

Figure 17:
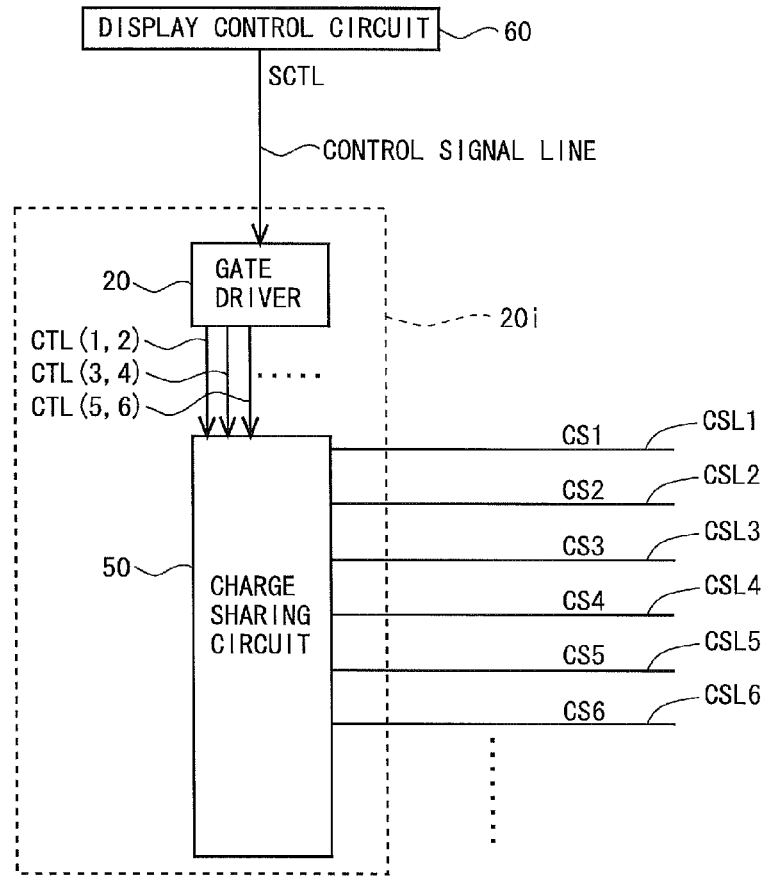
FIG. 17 is a block diagram for a configuration in which the short-circuit control signal to be supplied to the charge sharing circuit is generated in a gate driver, in a variant of the third embodiment.
Figure 18:
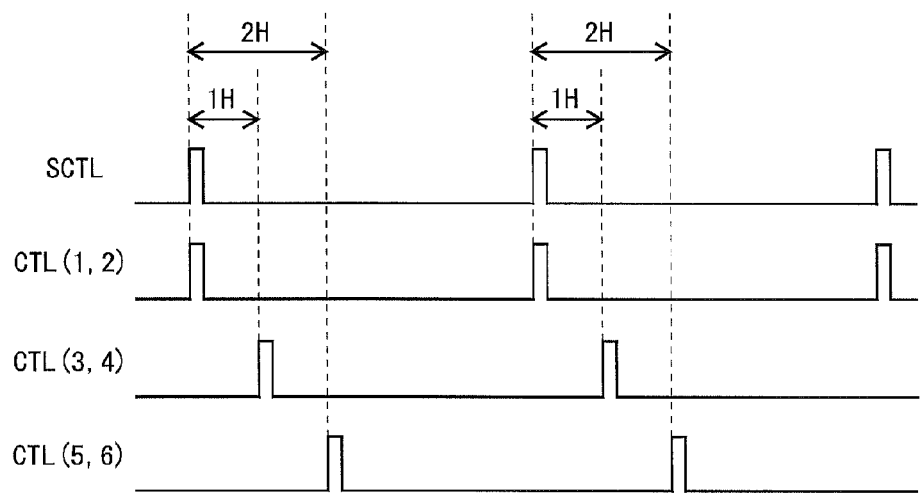
FIG. 18 is a signal waveform diagram for the configuration in which the short-circuit control signal to be supplied to the charge sharing circuit is generated in the gate driver, in the variant of the third embodiment.
Figure 19:
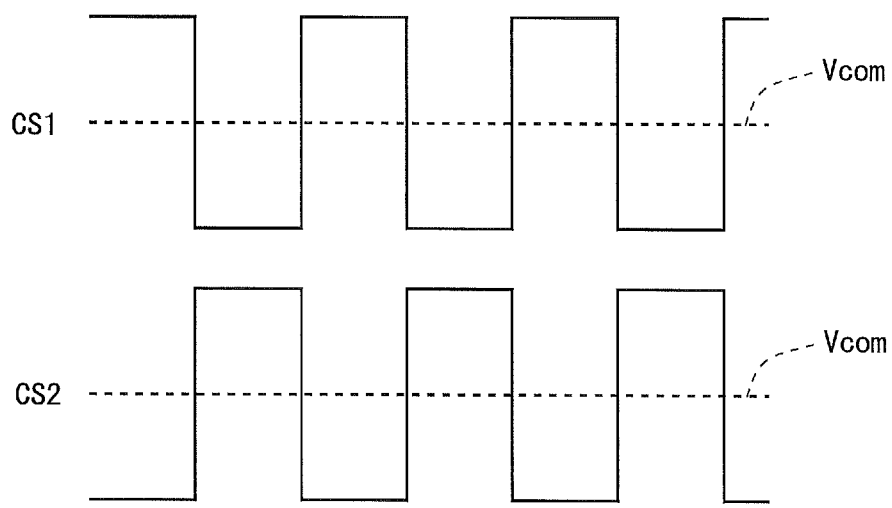
FIG. 19 is a waveform diagram of CS signals in a conventional example.

In the configuration shown in FIG. 17, the timing at which the polarity of CS signals CS3 and CS4 (polarity with reference to a common electrode potential Vcom) is reversed should be typically delayed by one horizontal scanning period relative to the timing at which the polarity of CS signals CS1 and CS2 is reversed. In addition, the timing at which the polarity of CS signals CS5 and CS6 is reversed should be typically delayed by two horizontal scanning periods relative to the timing at which the polarity of the CS signals CS1 and CS2 is reversed. As such, the timings of polarity reversals of CS signals supplied to any two sets of CS bus lines should be shifted relative to each other by a period corresponding to an integral multiple of one horizontal scanning period. Therefore, when taking a look at any two short-circuit control signals, the timings at which the short-circuit control signals change from a low level to a high level should be shifted relative to each other by a period corresponding to an integral multiple of one horizontal scanning period. Meanwhile, the gate driver 20 selectively drives the gate bus lines every horizontal scanning period. That is, the gate driver 20 can generate a signal whose level changes every horizontal scanning period, based on the timing of driving each gate bus line. Therefore, just by providing one control signal SCTL to the gate driver 20 as shown in FIG. 17, a plurality of short-circuit control signals that change from a low level to a high level at timings sequentially delayed by one horizontal scanning period as shown in FIG. 18 can be generated. By this, the number of control signal lines required to control a plurality of CS signals can be reduced over conventional devices.

In addition, although in the above-described third embodiment, it is premised that the charge sharing circuit 50 is formed on a board 71 provided external to the liquid crystal panel 100, the present invention is not limited thereto. The present invention can also be applied to the case of adopting a COG (Chip On Glass) scheme where IC chips are directly mounted on a glass substrate composing the liquid crystal panel 100. In this case, for example, the charge sharing circuit 50 may be included in a gate driver IC chip which is mounted on a glass substrate. In addition, it is also possible to include a CS voltage generating circuit 40 in the gate driver IC chip.

DESCRIPTION OF REFERENCE CHARACTERS

10: DISPLAY UNIT
11: PIXEL FORMATION PORTION
12: CS BUS LINE GROUP
13: CS MAIN LINE GROUP
20: GATE DRIVER
20i: GATE DRIVER IC CHIP
30: SOURCE DRIVER
30i: SOURCE DRIVER IC CHIP
40: CS VOLTAGE GENERATING CIRCUIT
50: CHARGE SHARING CIRCUIT
60: DISPLAY CONTROL CIRCUIT
70 to 74: BOARD (FPC, ETC.)
100: LIQUID CRYSTAL PANEL
CS and CS1 to CS12: CS SIGNAL
CSL and CSL1 to CSL12: CS BUS LINE
CTL: SHORT-CIRCUIT CONTROL SIGNAL
Vcom: COMMON ELECTRODE POTENTIAL

The invention claimed is:

1. A liquid crystal display device in which a pixel formation portion forming one pixel includes a first sub-pixel portion including a first pixel electrode and a second sub-pixel portion including a second pixel electrode, and which includes: a liquid crystal panel substrate including a display unit for displaying an image; a first auxiliary capacitance wiring line arranged on the liquid crystal panel substrate such that a first auxiliary capacitance is formed between itself and the first pixel electrode; and a second auxiliary capacitance wiring line arranged on the liquid crystal panel substrate such that a second auxiliary capacitance is formed between itself and the second pixel electrode, the liquid crystal display device comprising:

an auxiliary capacitance signal generating circuit that generates a first auxiliary capacitance signal to be provided to the first auxiliary capacitance wiring line, and a second auxiliary capacitance signal to be provided to the second auxiliary capacitance wiring line;

an auxiliary capacitance wiring line short-circuiting circuit that short-circuits the first auxiliary capacitance wiring line and the second auxiliary capacitance wiring line to each other based on a control signal, scanning signal lines arranged on the liquid crystal panel substrate so as to extend in parallel with the first auxiliary capacitance wiring line and the second auxiliary capacitance wiring line; and a scanning signal line drive circuit for driving the scanning signal lines, wherein the auxiliary capacitance wiring line short-circuiting circuit is formed on a board provided near one edge portion, in a direction in which the first auxiliary capacitance wiring line and the second auxiliary capacitance wiring line extend, of the liquid crystal panel substrate, the auxiliary capacitance wiring line short-circuiting circuit is formed on a same board as the scanning signal line drive circuit, and the auxiliary capacitance wiring line short-circuiting circuit and the scanning signal line drive circuit are provided within a same semiconductor chip.

* * * * *